United States Patent
Hirayama

(10) Patent No.: US 12,517,488 B2
(45) Date of Patent: Jan. 6, 2026

(54) CUTTING CONTROL APPARATUS, CUTTING CONTROL METHOD, AND CUTTING-CONTROL NON-TRANSITORY COMPUTER-READABLE RECORDING MEDIUM

(71) Applicant: Arum Incorporated, Ishikawa (JP)

(72) Inventor: Takayuki Hirayama, Ishikawa (JP)

(73) Assignee: Arum Incorporated, Ishikawa (JP)

( * ) Notice: Subject to any disclaimer, the term of this patent is extended or adjusted under 35 U.S.C. 154(b) by 547 days.

(21) Appl. No.: 18/098,231

(22) Filed: Jan. 18, 2023

(65) Prior Publication Data

US 2023/0236565 A1  Jul. 27, 2023

(30) Foreign Application Priority Data

Jan. 25, 2022  (JP) ................................. 2022-009031

(51) Int. Cl.
  *G05B 19/18* (2006.01)
  *G06F 8/30* (2018.01)

(52) U.S. Cl.
  CPC ............. *G05B 19/182* (2013.01); *G06F 8/30* (2013.01); *G05B 2219/37087* (2013.01)

(58) Field of Classification Search
  CPC ........ G05B 19/182; G05B 2219/37087; G05B 2219/36354; G05B 19/41865; G05B 2219/50323; G05B 19/40937; G05B 19/40931; G05B 2219/36287; G05B 19/40938; G06F 8/30; Y02P 90/02
  See application file for complete search history.

(56) References Cited

U.S. PATENT DOCUMENTS

2017/0364056 A1* 12/2017 Ono ..................... G06F 16/23

FOREIGN PATENT DOCUMENTS

| CN | 110647106 | * | 1/2020 | ........... G05B 19/401 |
| EP | 1 034 880 A1 | | 9/2000 | |
| JP | H11-129141 A | | 5/1999 | |
| JP | 2021039567 A | | 3/2021 | |

OTHER PUBLICATIONS

Extended European Search Report issued Jun. 15, 2023 in corresponding European Patent Application No. 23153158.3, 28 pages.

* cited by examiner

*Primary Examiner* — Eric J Yoon
(74) *Attorney, Agent, or Firm* — Osha Bergman Watanabe & Burton LLP

(57) ABSTRACT

A cutting control apparatus for a cutting control system includes: machine tools each processing an object to be processed; and cutting control apparatuses controlling the machine tools. The cutting control apparatus includes a weight coefficient obtaining unit configured to obtain a first weight coefficient in accordance with: first weight coefficient information in which a tool model and a first weight coefficient are associated for material information on each of materials; material information; and the tool model; and a revolution speed calculating unit configured to calculate a revolution speed of a tool in accordance with: cutting condition information; cutting speed obtained in accordance with tool information and dimension information; and the first weight coefficient. The first weight coefficient is an average value of values based on a plurality of the first weight coefficients obtained from the plurality of cutting control apparatuses.

12 Claims, 7 Drawing Sheets

| MANUFACTURER | MODEL | TOOL TYPE | TOOL DIAMETER | CUTTING EDGE LENGTH |
|---|---|---|---|---|
| COMPANY A | A1 | SQUARE-END MILL | 2 | 8 |
| COMPANY B | B1 | SQUARE-END MILL | 2 | 8 |
| ⋮ | ⋮ | ⋮ | ⋮ | ⋮ |

| MODEL | $\omega 1$ | $\omega 2$ | $\omega 3$ |
|---|---|---|---|
| A1 | 1.1 | 1.2 | 0.9 |
| A2 | 1.2 | 0.9 | 0.8 |
| ⋮ | ⋮ | ⋮ | ⋮ |

| PROCESSING TYPE | DIMENSION | | | TOOL | | | CUTTING SPEED | ... |
|---|---|---|---|---|---|---|---|---|
| | X | Y | Z | MANU-FACTURER | MODEL | ... | | |
| GROOVE | 3~3.99 | | 8 | COMPANY A | A1 | | 63.33 | |
| GROOVE | 4~4.99 | | 11 | COMPANY A | A2 | | 62.33 | |
| GROOVE | 5~5.99 | | 13 | COMPANY A | A3 | | 62.67 | |
| ⋮ | | | | | | | | |

CUTTING CONTROL APPARATUS, CUTTING CONTROL METHOD, AND CUTTING-CONTROL NON-TRANSITORY COMPUTER-READABLE RECORDING MEDIUM

CROSS-REFERENCE TO RELATED APPLICATION

The present application claims priority from Japanese Application JP2022-009031 filed on Jan. 25, 2022, the content to which is hereby incorporated by reference into this application.

BACKGROUND OF THE INVENTION

1. Field of the Invention

The present invention relates to a cutting control apparatus, a cutting control method, and a cutting-control non-transitory computer-readable recording medium.

2. Description of the Related Art

As disclosed in Japanese Unexamined Patent Application Publication No. 2021-39567, a known operating apparatus of a machining center includes a CNC apparatus connected to a machine tool and performing numerical control. The operating apparatus of the machining center includes a learned model; that is, a model learned in association with a processing condition, a tool trajectory, and a processing data set containing an execution program of the operation apparatus. In accordance with the learned model, processing steps of a target product are automatically set.

SUMMARY OF THE INVENTION

However, Japanese Unexamined Patent Application Publication No. 2021-39567 does not disclose either details as to how specifically the learned model is applied to the target product, or a factor including a weight coefficient for correcting a revolution speed of a tool.

An object of the present invention is to provide, for example, a cutting control apparatus; that is, even if a user of the cutting control apparatus handles unknown processing, in accordance with an average value of values based on a plurality of first weight coefficients obtained from a plurality of the cutting control apparatuses, a weight coefficient is automatically set to correct a revolution speed of a tool to be used for the processing so that the cutting control apparatus can perform more suitable processing.

In one or more embodiments of the present invention, a cutting control apparatus for a cutting control system includes: a plurality of machine tools each processing an object to be processed; and a plurality of cutting control apparatuses controlling the plurality of machine tools. The cutting control apparatus includes a dimension information calculating unit configured to calculate dimension information on the object to be processed, in accordance with: material information indicating a material of the object to be processed; and drawing data including shape information indicating a shape of the object to be processed; a processing type determining unit configured to determine a processing type of the object to be processed, in accordance with the dimension information; a tool type selecting unit configured to select a tool type in accordance with: the processing type; and tool type information associated with the processing type; a tool information determining unit configured to determine tool information to be used for processing the object to be processed, in accordance with tool information stored in association with a tool manufacturer, a tool model, the tool type, a tool diameter, and a cutting edge length; a weight coefficient obtaining unit configured to obtain a first weight coefficient in accordance with: first weight coefficient information in which the tool model and a first weight coefficient are associated for the material information on each of materials; the material information; and the tool model; and a revolution speed calculating unit configured to calculate a revolution speed of a tool in accordance with: cutting condition information in which the processing type, the dimension information, the tool information, and a cutting speed are associated; the cutting speed obtained in accordance with the tool information and the dimension information; and the first weight coefficient. The first weight coefficient is an average value of values based on a plurality of the first weight coefficients obtained from the plurality of cutting control apparatuses.

In one or more embodiments of the present invention, a method for controlling a cutting control apparatus for a cutting control system includes a plurality of machine tools each processing an object to be processed; and a plurality of cutting control apparatuses controlling the plurality of machine tools. The method includes calculating dimension information on the object to be processed, in accordance with: material information indicating a material of the object to be processed; and drawing data including shape information indicating a shape of the object to be processed; determining a processing type of the object to be processed, in accordance with the dimension information; selecting a tool type in accordance with: the processing type; and tool type information associated with the processing type; determining tool information to be used for processing the object to be processed, in accordance with tool information stored in association with a tool manufacturer, a tool model, the tool type, a tool diameter, and a cutting edge length; obtaining a first weight coefficient in accordance with: first weight coefficient information in which the tool model and a first weight coefficient are associated for the material information on each of materials; the material information; and the tool model; and calculating a revolution speed of a tool in accordance with: cutting condition information in which the processing type, the dimension information, the tool information, and a cutting speed are associated; the cutting speed obtained in accordance with the tool information and the dimension information; and the first weight coefficient. The first weight coefficient is an average value of values based on a plurality of the first weight coefficients obtained from the plurality of cutting control apparatuses.

In one or more embodiments of the present invention, a non-transitory computer-readable storage medium, containing a cutting control program of a cutting control apparatus for a cutting control system, includes a plurality of machine tools each processing an object to be processed; and a plurality of cutting control apparatuses controlling the plurality of machine tools. The cutting control program causing a computer to operate as: a dimension information calculating unit configured to calculate dimension information on the object to be processed, in accordance with: material information indicating a material of the object to be processed; and drawing data including shape information indicating a shape of the object to be processed; a processing type determining unit configured to determine a processing type of the object to be processed, in accordance with the dimension information; a tool type selecting unit configured to select a tool type in accordance with: the processing type; and tool type information associated with the processing type; a tool information determining unit configured to determine tool information to be used for processing the object to be processed, in accordance with tool information stored in association with a tool manufacturer, a tool model, the tool type, a tool diameter, and a cutting edge length; a weight coefficient obtaining unit configured to obtain a first weight coefficient in accordance with: first weight coefficient information in which the tool model and a first weight coefficient are associated for the material information on each of materials; the material information; and the tool model; and a revolution speed calculating unit configured to calculate a revolution speed of a tool in accordance with: cutting condition information in which the processing type, the dimension information, the tool information, and a cutting speed are associated; the cutting speed obtained in accordance with the tool information and the dimension information; and the first weight coefficient. The first weight coefficient is an average value of values based on a plurality of the first weight coefficients obtained from the plurality of cutting control apparatuses.

DETAILED DESCRIPTION OF THE INVENTION

Embodiments of the present invention will be described below, with reference to the drawings. Note that identical reference signs designate identical or substantially identical components throughout the drawings. Redundant descriptions of such components will be omitted.

Figure 1:
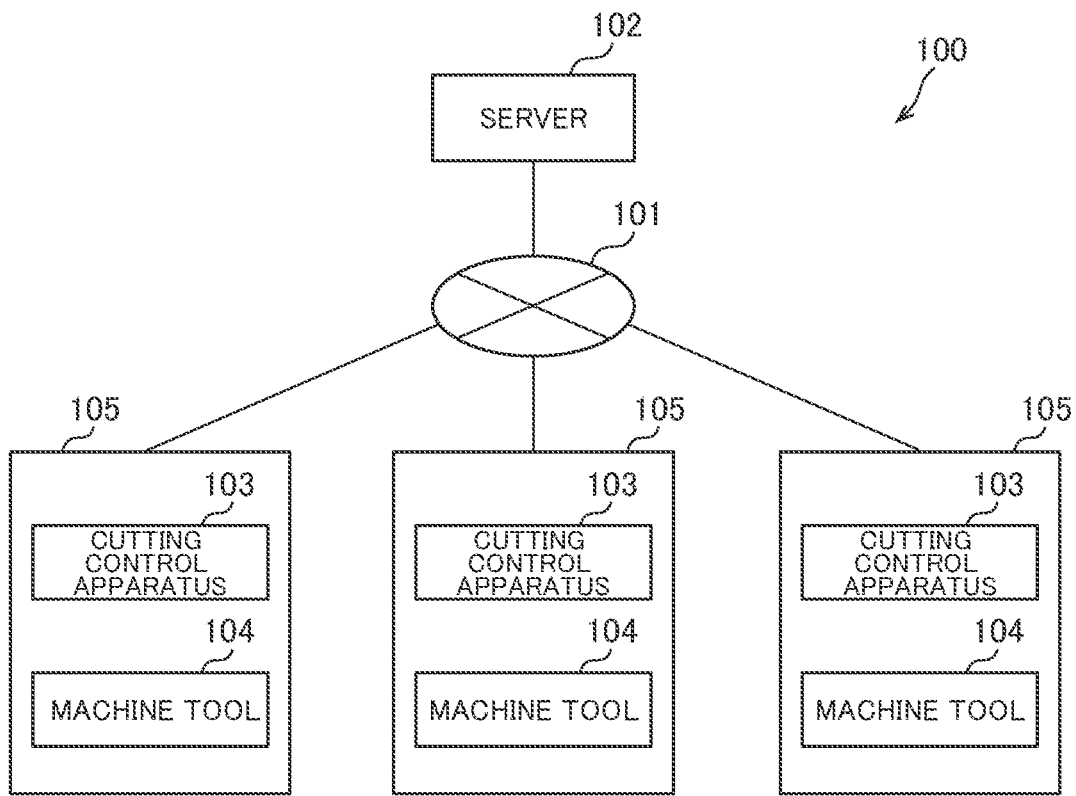
FIG. 1 is a diagram illustrating an outline of a cutting control system according to a first embodiment of the present invention.

FIG. 1 is a diagram illustrating an outline of a cutting control system according to a first embodiment of the present invention. As illustrated in FIG. 1, a cutting control system 100 includes: a server 102; and a plurality of sets 105 including a plurality of cutting control apparatuses 103 and machine tools 104. The server 102 and the plurality of sets 105 are connected together through a network 101 (e.g., the Internet).

For example, the server 102 is installed in an installation site designated by a company that provides the cutting control system 100. The cutting control apparatuses 103 and the machine tools 104 are installed in installation sites designated by other companies to which the company provides the cutting control system 100. Such installation sites are, for example, factories of the other companies.

The cutting control apparatuses 103 are, for example, terminal apparatuses connected to the machine tools 104. The cutting control apparatuses 103 are such devices as personal computers. Moreover, the machine tools 104 are, for example, such tools as NC machine tools to process an object to be processed in accordance with instructions from the cutting control apparatuses 103.

Figure 2:
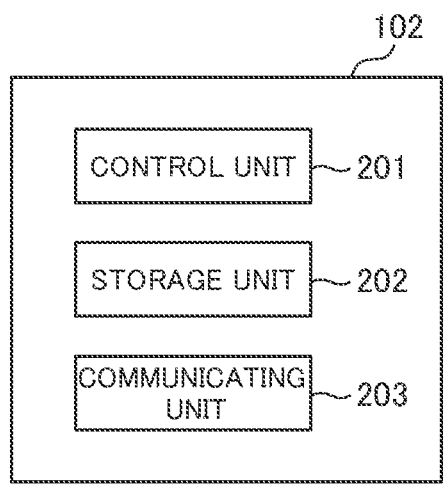
FIG. 2 is a diagram illustrating an exemplary hardware configuration of a server shown in FIG. 1.

FIG. 2 is a diagram illustrating an exemplary hardware configuration of the server. As illustrated in FIG. 2, the server 102 includes: a control unit 201; a storage unit 202; and a communicating unit 203. The control unit 201 is, for example, such a processor as a CPU, and operates on a program stored in the storage unit 202. The storage unit 202 is, for example, such an information recording medium as a hard disk, a ROM, or a RAM, and holds a program to be executed on the control unit 201. The communicating unit 203 is an interface of the network 101. In accordance with an instruction from the control unit 201, the communicating unit 203 transmits and receives information through the network 101. Moreover, the server 102 may be connected to one or more external databases.

Figure 3:
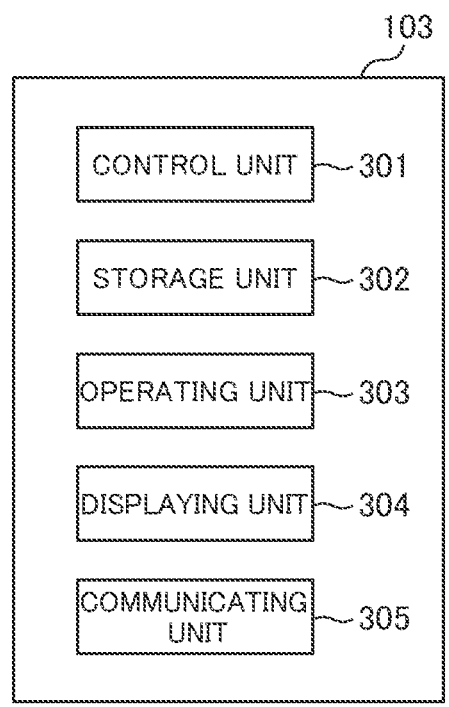
FIG. 3 is a diagram illustrating an exemplary hardware configuration of a cutting control apparatus shown in FIG. 1.

FIG. 3 is a diagram illustrating an exemplary hardware configuration of a cutting control apparatus. As illustrated in FIG. 3, each of the cutting control apparatuses 103 includes: a control unit 301; a storage unit 302; an operating unit 303; a displaying unit 304; and a communicating unit 305. Similar to the server 102 described above, the control unit 301 is, for example, a CPU, and operates on a program stored in the storage unit 302. The storage unit 302 is, for example, such an information recording medium as a hard disk, a ROM, or a RAM, and holds a program to be executed on the control unit 301.

The operating unit 303 is, for example, such an interface as a keyboard, a mouse, and a button. In accordance with a command operation from a user, the operating unit 303 outputs a detail of the command operation to the control unit 301. The displaying unit 304 is, for example, such a display as a liquid crystal display, a CRT display, or an organic EL display. In accordance with an instruction from the control unit 301, the displaying unit 304 displays information. The communicating unit 305 is a network interface. In accordance with an instruction from the control unit 301, the communicating unit 305 transmits and receives information through the network 101.

Note that the program to be processed on the control unit 301 may be, for example, either downloaded through the network 101, or provided through various computer-readable information recording media such as a CD-ROM and a DVD-ROM. Moreover, the configurations of the server 102 and the cutting control apparatus 103 are examples, and shall not be limited to such examples. Furthermore, the cutting control apparatus 103 may be connected to one or more external databases.

Figure 4:
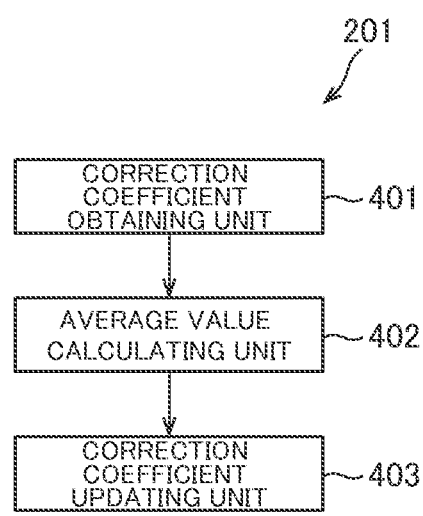
FIG. 4 is a diagram illustrating an exemplary functional configuration of a control unit of the server shown in FIG. 1.

FIG. 4 is a diagram illustrating an exemplary functional configuration of the control unit of the server according to this embodiment. As illustrated in FIG. 4, the control unit 201 of the server 102 includes: a correction coefficient obtaining unit 401; an average value calculating unit 402; and a correction coefficient updating unit 403. Note that described below is a case where, essentially, each of the cutting control apparatuses 103 transmits a first correction coefficient, a second correction coefficient and a third correction coefficient.

The correction coefficient obtaining unit 401, for example, obtains the first to third correction coefficients transmitted, together with a tool model to be described later, from each of the cutting control apparatuses 103. Note that details of the first to third correction coefficients will be described later.

The average value calculating unit 402, for example, calculates average values of the first to third correction coefficients respectively The first to third correction coefficients are transmitted from the cutting control apparatuses 103.

The correction coefficient updating unit 403, for example, updates first to third weight coefficients associated with the tool model to be described later and stored in the storage unit 202 of the server 102, using the average values of the calculated first to third correction coefficients respectively. Specifically, the correction coefficient updating unit 403 updates the first to third weight coefficients for every predetermined time, for example, for every hour or every day. Hence, the weight coefficient stored in the storage unit 302 is updated with the first to third correction coefficients.

Note that the configuration of the server 102 is an example, and shall not be limited to such an example. For example, only if the first to third correction coefficients match predetermined conditions, the average values of the first to third correction coefficients may be calculated and the first to third weight coefficients may be updated. Moreover, the first to third weight coefficients may be stored in such a storage apparatus as an external database, instead of the storage unit 202.

Figure 5:
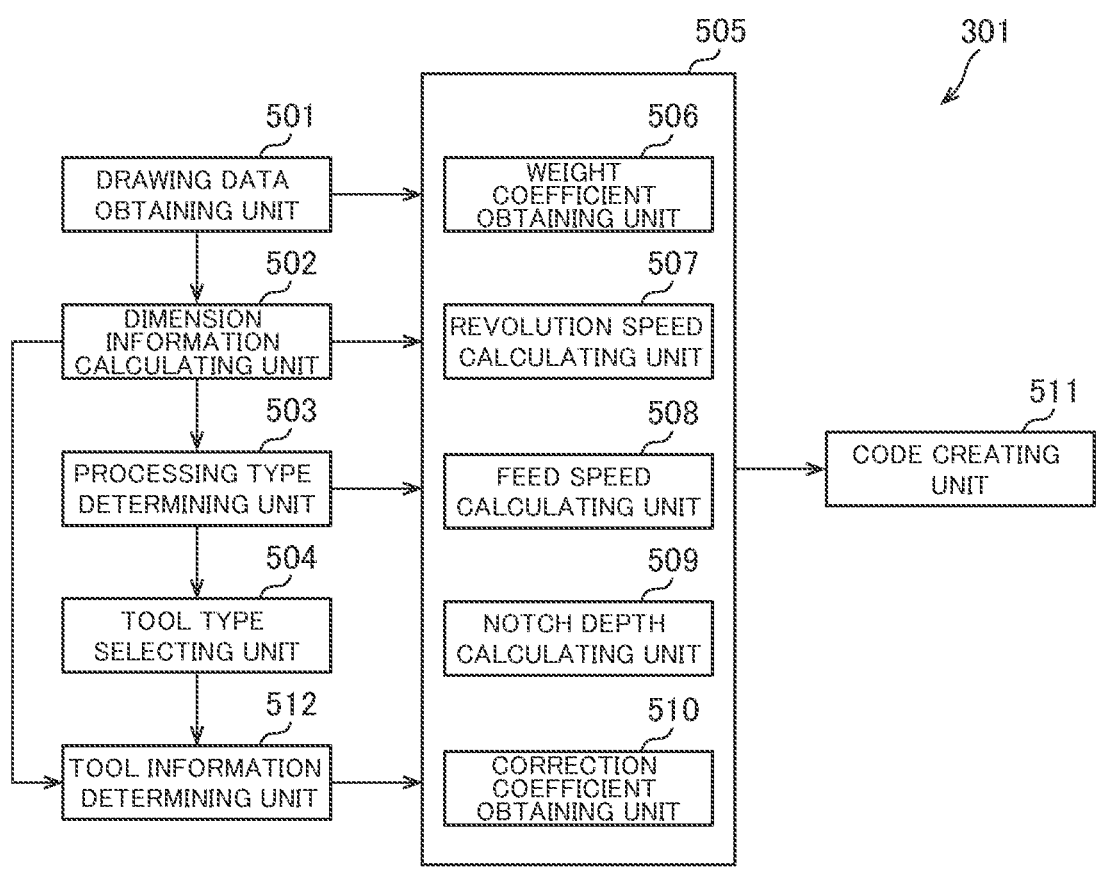
FIG. 5 is a diagram illustrating an exemplary functional configuration of a control unit of a cutting control apparatus shown in FIG. 1.

FIG. 5 is a diagram illustrating an exemplary functional configuration of the control unit of a cutting control apparatus according to this embodiment. As illustrated in FIG. 5, the control unit 301 of the cutting control apparatus 103 includes: a drawing data obtaining unit 501; a dimension information calculating unit 502; a processing type determining unit 503; a tool type selecting unit 504; a cutting condition setting unit 505; a code creating unit 511, and a tool information determining unit 512.

The drawing data obtaining unit 501 obtains: material information indicating a material of an object to be processed; and drawing data including shape information indicating a shape of the object to be processed. Here, the drawing data is, for example, an STL file; that is, an intermediate file for CAD. The drawing data has a file name including the material information. The drawing data includes 3D data of the object to be processed. Note that the format of the drawing data is an example, and shall not be limited to such an example.

The dimension information calculating unit 502 calculates, in accordance with the drawing data, dimension information in a form of coordinate values. The dimension information indicates XYZ dimensions of the object to be processed. Specifically, for example, the dimension information calculating unit 502 recognizes a shape of the object to be processed, and calculates the XYZ dimensions indicating the shape.

Here, processing types indicate types of processing including, for example, island processing that leaves a shape of an island, blind hole processing that forms a blind hole, and through hole processing that forms a through hole.

Specifically, for example, in accordance with the calculated dimension information, the processing type determining unit 503 slices the object to be processed in the Z-axis direction to obtain an intersection with an XY plane. Moreover, the processing type determining unit 503 slices the object to be processed in each of the X-axis direction and the Y-axis direction to obtain intersections with the Z-axis. Then, in accordance with the number of the intersections, the processing type determining unit 503 determines a processing type. More specifically, for example, the storage unit 302 of the cutting control apparatus 103 stores the processing types in association with, for example, the above number of intersections. In accordance with the number of the obtained intersections, the processing type determining unit 503 determines a processing type.

The tool type selecting unit 504 selects a tool type in accordance with: a processing type; and tool type information associated with the processing type. Here, tool types indicate types of tools such as, for example, a center drill and a square-end mill.

Specifically, for example, the tool type selecting unit 504 obtains a processing sequence, associated with the determined processing type, from the storage unit 302 of the cutting control apparatus 103. Here, the storage unit 302 stores processing sequence information associated, for each of the processing types, with a processing sequence to be used for the processing type. The tool type selecting unit 504 obtains the processing sequence information associated with the determined processing type. More specifically, if the processing type is, for example, the island processing, the storage unit 302 previously stores, in association with the processing type, processing sequence information indicating a processing sequence including drill-pilot-hole processing followed by square-end-mill processing. The tool type selecting unit 504 selects, as tool types, the center drill and the square-end mill that are tool types each associated with the processing sequence. Note that the above example describes a case where the tool types are selected through the processing sequence information. Alternatively, the tool types may be directly associated with the determined processing sequence.

The tool information determining unit 512 determines tool information to be used for processing the object to be processed, in accordance with a selected tool type, calculated dimension information, and tool information stored in association with a tool manufacturer, a tool model, a tool type, a tool diameter, and a cutting edge length. Here, for example, the tool manufacturer indicates the manufacturer of a tool. The tool model indicates the model of a tool. The tool type indicates the type of a tool. The tool diameter indicates the diameter of a tool, and the cutting edge length indicates the length of the cutting edge of a tool. Note that the tool information may be further associated with other information such as a shank diameter and a tool number.

Figures 6, 7:
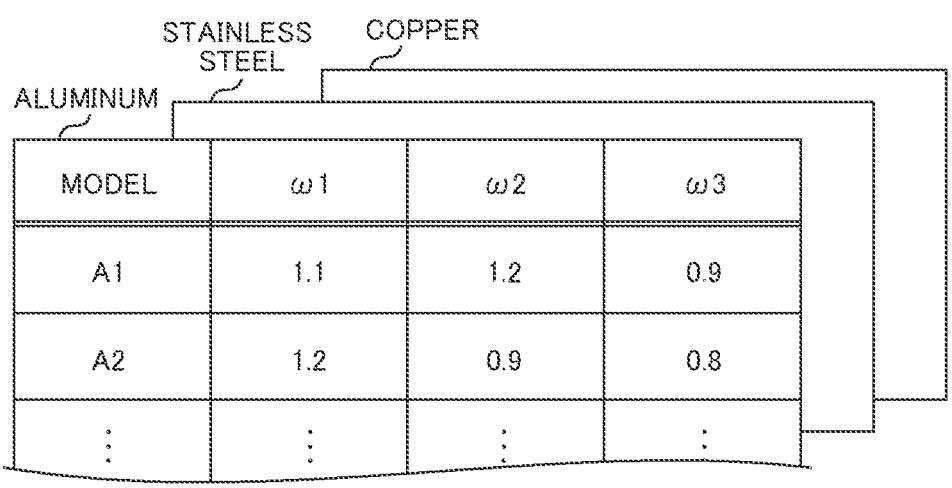
FIG. 6 is a diagram illustrating an example of tool information.
FIG. 7 is a diagram illustrating an example of weight-coefficient-related information.

For example, as illustrated in FIG. 6, the storage unit 302 of the cutting control apparatus 103 stores the tool information stored in association with a manufacturer, a model, a tool type, a tool diameter, and a cutting edge length. The tool information determining unit 512 obtains the stored tool information in accordance with the selected tool type and the calculated dimension information. For example, the dimension information is used to select tool information including a length of a cutting edge greater than the Z-dimension of a through hole. For example, if a square-end mill is selected as the tool type and the dimension information matches a tool diameter 2 and a cutting edge length 1, the tool information determining unit 512, for example, selects the tool information on the first row in FIG. 6 (TOOL MANUFACTURER: COMPANY A, TOOL MODEL: A1, TOOL TYPE: SQUEARE-END MILL, TOOL DIAMETER: 2, CUTTING EDGE LENGTH: 8). Note that the tool information may be stored in either the storage unit 302 of the server 102 or an external database. Note that the tool information illustrated in FIG. 6 is an example. The tool information may be stored in association with other information such as a nose radius, a tool number, and a shank diameter.

The cutting condition setting unit 505 includes: a weight coefficient obtaining unit 506; a revolution speed calculating unit 507; a feed speed calculating unit 508; a notch depth calculating unit 509; and a correction coefficient obtaining unit 510. The cutting condition setting unit 505, for example, calculates a revolution speed, a feed speed, and a notch depth of a tool. The cutting condition setting unit 505 will be described more specifically below.

The weight coefficient obtaining unit 506 obtains the first to third weight coefficients in accordance with: first to third weight coefficient information in which a tool model and the first to third weight coefficients are associated for material information on each of materials; the material information included in the drawing data; and a tool model selected by the tool information determining unit 512.

Here, the storage unit 202 of the server 102 stores, for example, as illustrated in FIG. 7, weight-coefficient-related information in which a tool model and first to third weight coefficients ω1 to ω3 are associated for material information on each of the materials. In accordance with the tool model included in the selected tool information and the material information obtained by the drawing data obtaining unit 501, the weight coefficient obtaining unit 506 obtains the first to third weight coefficients, associated with the tool model and the material information, from the storage unit 202 of the server 102 through the communicating unit 305. Note that, for example, the weight coefficient may be stored in an external database. Moreover, the weight-coefficient-related information illustrated in FIG. 7 is an example. The weight-coefficient-related information may be stored in association with other information such as a tool manufacturer.

The revolution speed calculating unit 507 calculates a revolution speed of a tool in accordance with: cutting condition information in which a processing type, dimension information, tool information, and a cutting speed are associated; the cutting speed obtained in accordance with the tool information and the dimension information; and the first weight coefficient.

Figures 8, 9:
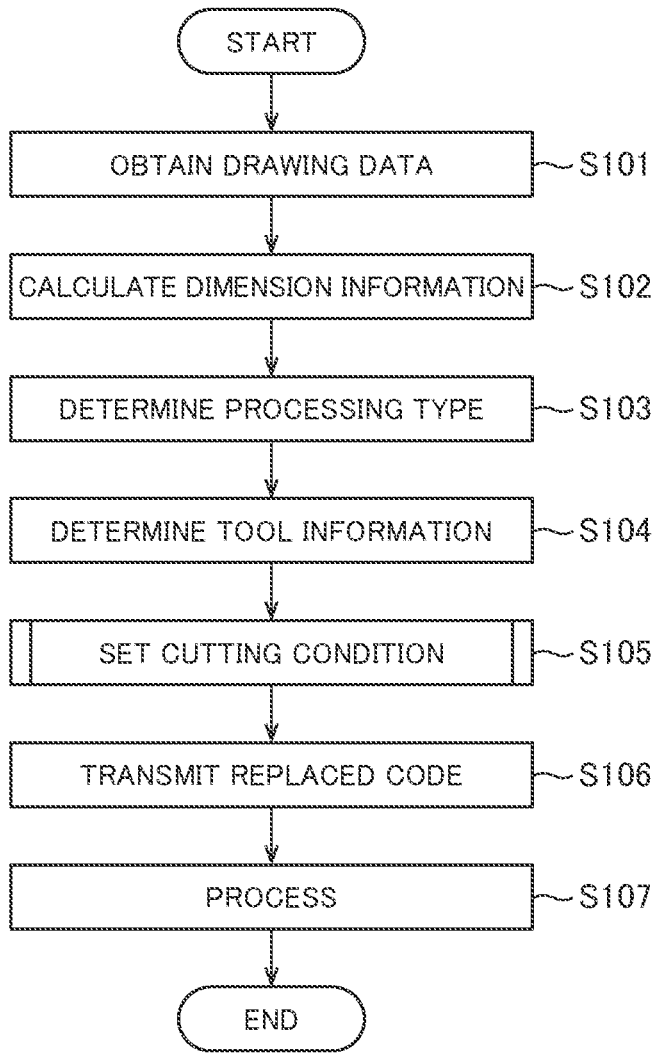
FIG. 8 is a diagram illustrating an example of cutting condition information.
FIG. 9 is a flowchart showing an example of processing executed on the cutting control apparatus.

Specifically, for example, as illustrated in FIG. 8, the storage unit 302 of the cutting control apparatus 103 stores the cutting condition information in which a processing type, dimension information, tool information, and a cutting speed are associated. The revolution speed calculating unit 507 obtains a cutting speed from the storage unit 302 of the cutting control apparatus 103. The cutting speed is associated with a processing type determined by the processing type determining unit 503, dimension information calculated by the dimension information calculating unit 502, and tool information determined by the tool information determining unit 512. Note that the cutting condition information may be stored in association with other information such as thickness information indicating a thickness of the object to be processed and finish information indicating roughness of the final step for cutting. Moreover, the cutting condition information may be stored in either the server 102 or an external storage device.

The revolution speed calculating unit 507 calculates a revolution speed N in accordance with the obtained cutting speed, the obtained first weight coefficient ω1, and the tool diameter included in the determined tool information. Specifically, for example, the revolution speed calculating unit 507 calculates the revolution speed N using an equation (1) below.

$$\text{Revolution Speed } N = \omega 1 \times \left\{ \frac{1000 \times \text{Cutting Speed}\,(Vc)}{\pi \times \text{Tool Diameter}\,(Dc)} \right\} \quad [\text{Math. 1}]$$

Here, as described above, the first weight coefficient ω1 is set to a value in accordance with an average value of values based on the plurality of first weight coefficients obtained from the plurality of cutting control apparatuses 103. Hence, even if the processing is unknown for the user of the cutting control apparatus 103, the first weight coefficient suitable for the processing is automatically set, thereby making it possible to perform more suitable processing.

Moreover, the first weight coefficient ω1 may be, for example, displayed on the displaying unit 304, and the displayed first weight coefficient may be corrected by the user, using the operating unit 303. In such a case, the corrected first weight coefficient; namely, a first correction coefficient ω1', is obtained by the correction coefficient obtaining unit 401. The revolution speed calculating unit 507 calculates a revolution speed of a tool, using the correction coefficient ω1' corrected by the user. Moreover, in such a case, the correction coefficient ω1' is transmitted together with the tool model through the communicating unit 305 to the server 102. As described above, the server 102 calculates an average value of the first correction coefficients ω1' transmitted from the cutting control apparatuses 103. The average value of the first correction coefficients is stored in the storage unit 202, as the first weight coefficient ω1 associated with the tool model. Furthermore, in such a case, if the user does not make any correction with the cutting control apparatus 103, the first weight coefficient ω1 is used. Also in such a case, the first weight coefficient ω1 is transmitted to the server 102. Then, an average value of first correction coefficients ω1' corrected by the other cutting control apparatuses 103 and weight coefficients ω1 not corrected by the other cutting control apparatuses 103 is stored in the storage unit 202, as the first weight coefficient ω1 associated with the tool model.

The feed speed calculating unit 508 calculates a feed speed of a tool in accordance with: a second weight coefficient obtained by the weight coefficient obtaining unit 506; a linear equation previously determined for each of the tool models; a tool diameter and a tool model included in tool information selected by the tool information determining unit 512; and a revolution speed calculated by the revolution speed calculating unit 507.

Specifically, for example, the feed speed calculating unit 508 calculates a feed speed Vf using an equation (2) below.

$$\text{Feed Speed}\,Vf = \omega 2 \times \{F_z \times N \times Zn\} \quad [\text{Math. 2}]$$

Here, ω2 is the second weight coefficient obtained by the weight coefficient obtaining unit 506, and the revolution speed N is a revolution speed calculated by the revolution speed calculating unit 507. Moreover, Zn represents a half of an obtained tool diameter (Dc).

Furthermore, Fz, which represents a feed amount per cutting edge of the tool, is obtained by a liner equation Fz=a*Dc+b. Here, a and b are obtained by linear regression analysis performed on values input by a technician for each of the tool models and tool diameters on the basis of, for example, his or her experience. Such a and b are previously associated with each of the tool models and tool diameters, and stored in the storage unit 302 of the cutting control apparatus 103. Note that such a and b may be stored in either the storage unit 302 of the server 102 or an external storage apparatus.

In accordance with a tool diameter and a tool model included in tool information selected by the tool information determining unit 512, the feed speed calculating unit 508 obtains a and b associated with the tool diameter and the tool model, and calculates Fz.

If, for a feed amount per one edge, all the values for each of the tool models and tool diameters input by the technician are organized as a database, the amount of data would be extremely large. However, as described above, the data is subjected to linear regression analysis to be a liner equation, such that the calculation amount can be significantly reduced. Hence, even if a computer with an ordinary CPU is used, the computation can be performed at high speed, thereby making it possible to significantly reduce a period from obtaining the drawing data to encoding to be described later.

Here, as described above, the second weight coefficient ω2 is set to a value in accordance with an average value of values based on the plurality of second weight coefficients obtained from the plurality of cutting control apparatuses 103. Hence, even if the processing is unknown for the user of the cutting control apparatus 103, the second weight coefficient suitable for the processing is automatically set, thereby making it possible to perform more suitable processing.

Note that, similar to the first weight coefficient, the obtained second weight coefficient ω2 may be corrected by the user. In such a case, the corrected second weight coefficient; namely, a second correction coefficient ω2', is obtained by the correction coefficient obtaining unit 510. The revolution speed calculating unit 508 calculates a revolution speed of a tool, using the correction coefficient ω2' corrected by the user. Moreover, in such a case, the correction coefficient ω2' is transmitted together with the tool model through the communicating unit 305 to the server 102. As described above, the server 102 calculates an average value of the second correction coefficients transmitted from the cutting control apparatuses 103. The average value of the second correction coefficients is stored in the storage unit 202, as the second weight coefficient associated with the tool model. Furthermore, in such a case, if the user does not make any correction with the cutting control apparatus 103, the second weight coefficient ω2 is used. Also in such a case, the second weight coefficient ω2 is transmitted to the server 102. Then, an average value of second correction coefficients ω2' corrected by the other cutting control apparatuses 103 and weight coefficients ω2 not corrected by the other cutting control apparatuses 103 is stored in the storage unit 202, as the second weight coefficient ω2 associated with the tool model.

The notch depth calculating unit 509 calculates a notch depth of a tool in accordance with a tool diameter included in tool information selected by the tool information determining unit 512 and a third weight coefficient obtained by the weight coefficient obtaining unit 506.

Specifically, for example, the notch depth calculating unit 509 calculates a notch depth F of a tool using an equation (3) below.

$$\text{Notch Depth} F = \omega 3 \times \{\text{Tool Diameter}(D_0)\} \quad [\text{Math. 3}]$$

In the equation (3), ω3 represents the third weight coefficient obtained by the weight coefficient obtaining unit 506 as described above. The tool diameter is included in the tool information selected by the tool information determining unit 512.

As described above, the third weight coefficient ω3 is set to a value in accordance with an average value of values based on the plurality of third weight coefficients obtained from the plurality of cutting control apparatuses 103. Hence, even if the processing is unknown for the user of the cutting control apparatus 103, the third weight coefficient suitable for the processing is automatically set, thereby making it possible to perform more suitable processing.

Note that, similar to the first weight coefficient, the obtained third weight coefficient ω3 may be corrected by the user. In such a case, the notch depth is calculated, using the third correction coefficient ω3' corrected by the user. Moreover, in such a case, the correction coefficient ω3' is transmitted together with the tool model through the communicating unit 305 to the server 102. As described above, the server 102 calculates an average value of the third correction coefficients transmitted from the cutting control apparatuses 103. The average value of the third correction coefficients is stored in the storage unit 202, as the third weight coefficient associated with the tool model. Furthermore, in such a case, if the user does not make any correction with the cutting control apparatus 103, the third weight coefficient ω3 is used. Also in such a case, the third weight coefficient ω3 is transmitted to the server 102. Then, an average value of third correction coefficients ω3' corrected by the other cutting control apparatuses 103 and weight coefficients ω3 not corrected by the other cutting control apparatuses 103 is stored in the storage unit 202, as the third weight coefficient ω3 associated with the tool model.

The code creating unit 511 creates respective codes to control the machine tool 104 based on the calculated revolution speed, feed speed, and notch depth. For example, the codes include so-called the G-code, the M-code, the F-code, and the T-code. Then, the code creating unit 511 transmits the codes through the communicating unit 305 to the machine tool 104.

The machine tool 104 processes an object to be processed, in accordance with the codes. Note that the machine tool 104 may measure the object to be processed after processing. If the object is not processed sufficiently precisely, the machine tool 104 may additionally process the object to compensate for the insufficient processing. Note that the machine tool 104 is, for example, an NC machine tool 104. The machine tool 104 performs processing based on an order of tools to be used for a material and work steps required for the processing, in accordance with an instruction of numeric information.

Figure 10:
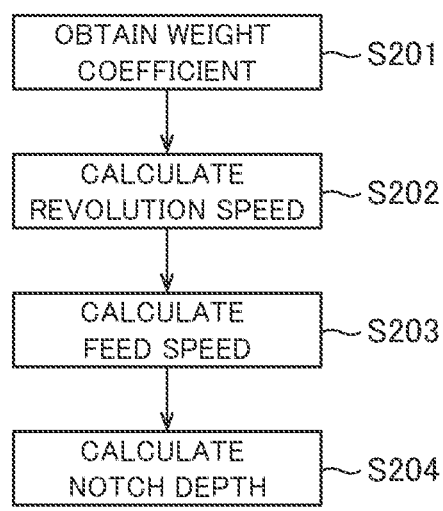
FIG. 10 is a flowchart showing an exemplary detail of S105 in FIG. 9.

Next, with reference to FIGS. 9 and 10, an exemplary workflow is described as to the processing of the cutting control apparatus 103 from obtaining drawing data of the object to be processed, to transmitting codes to the machine tool 104 by the cutting control apparatus 103, and to starting the processing by the machine tool 104 in accordance with the codes.

First, the drawing data obtaining unit 501 obtains: material information indicating a material of an object to be processed; and drawing data including shape information indicating a shape of the object to be processed (S101). Next, in accordance with the drawing data, the dimension information calculating unit 502 calculates dimension information in a form of coordinate values (S102). The dimension information indicates XYZ dimensions of the object to be processed.

In accordance with the calculated dimension information, the processing type determining unit 503 determines a processing type (S103). Next, in accordance with the processing type and tool type information associated with the processing type, the tool type selecting unit 504 selects a tool type. In accordance with the selected tool type, the calculated dimension information, and tool information stored in association with a tool manufacturer, a tool model, a tool type, a tool diameter, and a cutting edge length, the tool information determining unit 512 determines tool information to be used for processing the object to be processed (S104).

Next, the cutting condition setting unit 505 calculates, for example, a revolution speed, a feed speed, and a notch depth of the tool (S105). The details of flow at S105 is described, with reference to FIG. 10.

As shown in FIG. 10, the weight coefficient obtaining unit 506 obtains first to third weight coefficients in accordance with: first to third weight coefficient information in which a tool model and the first to third weight coefficients are associated for material information on each of materials; the material information included in the drawing data; and the tool model selected by the tool information determining unit 512 (S201).

Next, the revolution speed calculating unit 507 calculates a revolution speed of the tool in accordance with: cutting condition information in which the processing type, the dimension information, the tool information, and the cutting speed are associated; a cutting speed obtained in accordance with the tool information and the dimension information; and the first weight coefficient (S202).

The feed speed calculating unit 508 calculates a feed speed of the tool in accordance with: a second weight coefficient obtained by the weight coefficient obtaining unit 506; a linear equation previously determined for each of a plurality of the tool models; a tool diameter and a tool type included in the tool information selected by the tool information determining unit 512; and the revolution speed calculated by the revolution speed calculating unit 507 (S203).

The notch depth calculating unit 509 calculates a notch depth of the tool, in accordance with the tool diameter included in the tool information selected by the tool information determining unit 512 and a third weight coefficient obtained by the weight coefficient obtaining unit 506 (S204). Next, the processing proceeds to S106 in FIG. 9.

As illustrated in FIG. 9, the code creating unit 511 creates respective codes to control the machine tool 104 based on the calculated revolution speed, feed speed, and notch depth with, and transmits the codes through the communicating unit 305 to the machine tool (S106). The machine tool 104 processes the object to be processed, in accordance with the codes (S107). Then, the processing ends.

Note that the workflow of the above processing is an example, and this embodiment shall not be limited to such an example. For example, in the example described above, the first to third weight coefficients are obtained at S201. However, the workflow may be different as long as the second weight coefficient is obtained before S203 and the third weight coefficient is obtained before S204.

According to this embodiment, even if the processing is unknown for the user of the cutting control apparatus, the first to third weight coefficients suitable for the processing is automatically set, thereby making it possible to perform more suitable processing. Moreover, compared with a conventional technique, this embodiment can extremely reduce the number of computations, thereby making it possible to significantly reduce processing time and simplify the processing. Furthermore, this embodiment allows the user to handle a new material.

Next, a second embodiment of the present invention is described. Note that, in the second embodiment below, the explanation which is the same as or similar to the first embodiment will not be described. The main difference from the first embodiment is that the cutting condition setting unit 505 further includes a coefficient determining unit 513.

Figure 11:
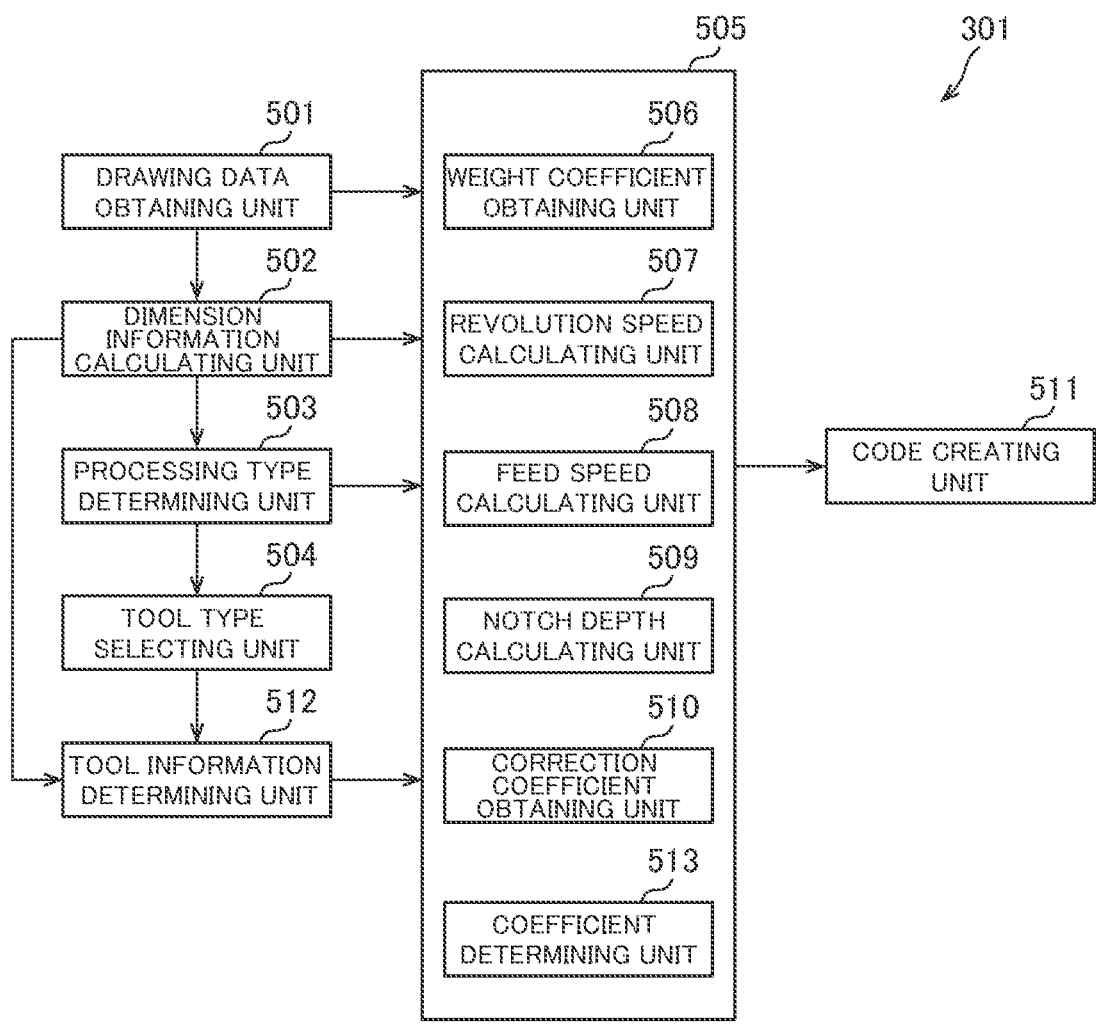
FIG. 11 is a diagram illustrating an exemplary functional configuration of the control unit of the cutting control apparatus according to a second embodiment of the present invention.

FIG. 11 is a diagram illustrating an exemplary functional configuration of the control unit of the cutting control apparatus according to a second embodiment. As illustrated in FIG. 11, the cutting condition setting unit 505 further includes the coefficient determining unit 513.

When the first to third correction coefficients are obtained, the coefficient determining unit 513 compares the first to third correction coefficients with the first to third weight coefficient obtained from the storage unit 202 of the server 102. Here, as described above, the first to third weight coefficients corresponds to, for example, average values of the first to third correction coefficients obtained from the cutting control apparatuses 103.

If the coefficient determining unit 513 determines that the first weight coefficient is greater than the first correction coefficient, the revolution speed calculating unit 507 calculates a revolution speed, using the first weight coefficient. Moreover, if the coefficient determining unit 513 determines that the second weight coefficient is greater than the second correction coefficient, the feed speed calculating unit 508 calculates a feed speed, using the second weight coefficient. Furthermore, if the coefficient determining unit 513 determines that the third weight coefficient is greater than the third correction coefficient, the notch depth calculating unit 509 calculates a notch depth, using the third weight coefficient.

Meanwhile, if the coefficient determining unit 513 determines that the first weight coefficient is smaller than, or equal to, the first correction coefficient, the revolution speed calculating unit 507 calculates a revolution speed, using the first correction coefficient. If the coefficient determining unit 513 determines that the second weight coefficient is smaller than, or equal to, the second correction coefficient, the feed speed calculating unit 508 calculates a feed speed, using the second correction coefficient. Moreover, if the coefficient determining unit 513 determines that the third weight coefficient is smaller than, or equal to, the third correction coefficient, the notch depth calculating unit 509 calculates a notch depth, using the third correction coefficient.

According to this embodiment, the weight coefficients can be automatically adjusted in accordance with the correction coefficients corrected by the user, making it possible to improve user-friendliness of the cutting control apparatus.

The present invention shall not be limited to the above first and second embodiments. The configurations of the first and second embodiments may be replaced with: configurations substantially the same as the configurations of the above embodiments; configurations having substantially the same advantageous effects as the advantageous effects of the above embodiments; or configurations capable of achieving substantially the same object as the object of the above embodiments.

What is claimed is:

1. A cutting control apparatus for a cutting control system including: a plurality of machine tools including a first machine tool, each processing an object to be processed;
and a plurality of cutting control apparatuses controlling the plurality of machine tools, wherein the cutting control apparatus is configured to:
calculate dimension information on the object to be processed in accordance with:
material information indicating a material of the object to be processed and
drawing data including shape information indicating a shape of the object to be processed;
determine a processing type of the object to be processed in accordance with the dimension information;
select a tool type in accordance with:
the processing type and
tool type information associated with the processing type;
determine tool information to be used for processing the object to be processed in accordance with:
tool information stored in association with a tool manufacturer,
a tool model,
the tool type,
a tool diameter, and
a cutting edge length;
obtain a first weight coefficient in accordance with:
first weight coefficient information in which the tool model and a first weight coefficient are associated with material information for each of a plurality of materials,
the material information, and
the tool model;
calculate a revolution speed of the first machine tool in accordance with:
cutting condition information in which the processing type, the dimension information, the tool information, and a cutting speed are associated;
the cutting speed obtained in accordance with the tool information and the dimension information; and
the first weight coefficient; and
cause the first machine tool to perform a cutting operation based on the calculated revolution speed, wherein the first weight coefficient is an average value of values based on a plurality of first weight coefficients obtained from the plurality of cutting control apparatuses.

2. The cutting control apparatus according to claim 1, wherein, when a first correction coefficient is obtained, the cutting control apparatus is further configured to calculate the revolution speed in accordance with the cutting speed and the first correction coefficient; and
wherein the first correction coefficient is the first weight coefficient input by a user and corrected.

3. The cutting control apparatus according to claim 2, wherein, when the first correction coefficient is obtained, the cutting control apparatus is further configured to calculate the revolution speed in accordance with:
the cutting speed and
the first correction coefficient, wherein if the first correction coefficient is greater than an average value of the plurality of first weight coefficients, the first correction coefficient is the first weight coefficient input by the user and corrected.

4. The cutting control apparatus according to claim 1, wherein the cutting control apparatus is further configured to obtain a second weight coefficient in accordance with:
second weight coefficient information in which the tool model and a second weight coefficient are associated with material information for each of the plurality of materials,
the material information, and
the tool model;
wherein the cutting control apparatus is further configured to calculate a feed speed of the tool in accordance with:
the second weight coefficient,
a linear equation previously determined for each of a plurality of tool models,
the tool diameter,
the tool model, and
the revolution speed ; and
wherein the second weight coefficient is an average value of values based on a plurality of second weight coefficients obtained from the plurality of cutting control apparatuses.

5. The cutting control apparatus according to claim 4, wherein, when a second correction coefficient is obtained, the cutting control apparatus is further configured to calculate the feed speed of the first machine tool in accordance with:
the second correction coefficient which is the second weight coefficient input by a user and corrected,
the linear equation previously determined for each of the plurality of tool models,
the tool diameter,
the tool model, and
the revolution speed.

6. The cutting control apparatus according to claim 5, wherein, when the second correction coefficient is obtained, the cutting control apparatus is further configured to calculate the feed speed of the tool in accordance with:
the second correction coefficient,
the linear equation previously determined for each of the plurality of tool models,
the tool diameter,
the tool model, and
the revolution speed, wherein if the second correction coefficient is greater than an average value of the plurality of second weight coefficients, the second correction coefficient is the second weight coefficient input by the user and corrected.

7. The cutting control apparatus according to claim 1, wherein the cutting control apparatus is further configured to obtain a third weight coefficient in accordance with:
third weight coefficient information in which the tool model and a third weight coefficient are associated with material information for each of the plurality of materials,
the material information, and
the tool model;
wherein the cutting control apparatus is further configured to calculate a notch depth of the first machine tool in accordance with the tool diameter and the third weight coefficient; and
wherein the third weight coefficient is an average value of values based on a plurality of third weight coefficients obtained from the plurality of cutting control apparatuses.

8. The cutting control apparatus according to claim 7, wherein when a third correction coefficient is obtained, the cutting control apparatus is configured to calculate the notch depth of the first machine tool in accordance with the tool diameter and the third correction coefficient, which is the third weight coefficient input by a user and corrected.

9. The cutting control apparatus according to claim 8, wherein, when the third correction coefficient is obtained, the cutting control apparatus is configured to calculate the notch depth of the first machine tool in accordance with:
   the tool diameter, and
   the third correction coefficient, wherein if the third correction coefficient is greater than an average value of the plurality of third weight coefficients, the third correction coefficient is the third weight coefficient input by the user and corrected.

10. The cutting control apparatus according to claim 7, wherein the cutting control apparatus is further configured to create a code for controlling the machine tool in accordance with:
    the revolution speed,
    a feed speed of the first machine tool, and
    the notch depth.

11. A method for controlling a cutting control apparatus for a cutting control system including: a plurality of machine tools including a first machine tool, each processing an object to be processed; and a plurality of cutting control apparatuses controlling the plurality of machine tools, the method comprising:
    calculating dimension information on the object to be processed, in accordance with:
       material information indicating a material of the object to be processed and
       drawing data including shape information indicating a shape of the object to be processed;
    determining a processing type of the object to be processed in accordance with the dimension information;
    selecting a tool type in accordance with:
       the processing type and
       tool type information associated with the processing type;
    determining tool information to be used for processing the object to be processed in accordance with:
       tool information stored in association with a tool manufacturer,
       a tool model,
       the tool type,
       a tool diameter, and
       a cutting edge length;
    obtaining a first weight coefficient in accordance with first weight coefficient information in which the tool model and a first weight coefficient are associated with material information for each of a plurality of materials; the material information; and the tool model;
    calculating a revolution speed of the first machine tool in accordance with:
       cutting condition information in which the processing type, the dimension information, the tool information, and a cutting speed are associated;
       the cutting speed obtained in accordance with the tool information and the dimension information; and
       the first weight coefficient; and
    causing the first machine tool to perform a cutting operation based on the calculated revolution speed,
    wherein the first weight coefficient is an average value of values based on a plurality of first weight coefficients obtained from the plurality of cutting control apparatuses.

12. A non-transitory computer-readable storage medium containing a cutting control program of a cutting control apparatus for a cutting control system including: a plurality of machine tools including a first machine tool, each processing an object to be processed; and a plurality of cutting control apparatuses controlling the plurality of machine tools, the cutting control program causing a computer to:
    calculate dimension information on the object to be processed, in accordance with:
       material information indicating a material of the object to be processed and drawing data including shape information indicating a shape of the object to be processed;
    determine a processing type of the object to be processed in accordance with the dimension information;
    select a tool type in accordance with:
       the processing type and
       tool type information associated with the processing type;
    determine tool information to be used for processing the object to be processed, in accordance with tool information stored in association with a tool manufacturer, a tool model, the tool type, a tool diameter, and a cutting edge length;
    obtain a first weight coefficient in accordance with:
       first weight coefficient information in which the tool model and a first weight coefficient are associated with material information for each of a plurality of materials,
       the material information, and
       the tool model;
    calculate a revolution speed of the first machine tool in accordance with:
       cutting condition information in which the processing type, the dimension information, the tool information, and a cutting speed are associated;
       the cutting speed obtained in accordance with the tool information and the dimension information; and
       the first weight coefficient; and
    cause the first machine tool to perform a cutting operation based on the calculated revolution speed,
    wherein the first weight coefficient is an average value of values based on a plurality of first weight coefficients obtained from the plurality of cutting control apparatuses.

* * * * *